United States Patent [19]

Higginson et al.

[11] Patent Number: 5,588,693
[45] Date of Patent: Dec. 31, 1996

[54] MODULAR TRUCK CARGO AREA BODY

[76] Inventors: Roy C. Higginson, Ramsden Farm Box 4000 Rd. 4, Birdsboro, Pa. 19508; Paul L. Whiteman, R.D. #1 Box 63, Morgantown, Pa. 19543

[21] Appl. No.: 299,219

[22] Filed: Aug. 31, 1994

[51] Int. Cl.⁶ .................................... B60R 27/00
[52] U.S. Cl. .................... 246/183; 296/29; 296/203
[58] Field of Search .................. 296/181, 183, 296/29, 203, 209; 52/92.3, 272, 283, 264, 270, 236.9

[56] References Cited

U.S. PATENT DOCUMENTS

| | | | |
|---|---|---|---|
| 935,402 | 9/1909 | Piver . | |
| 3,055,461 | 9/1962 | DeRidder | 189/34 |
| 3,356,398 | 12/1967 | Nilsson et al. | 287/103 |
| 3,746,388 | 7/1973 | Robinson | 296/183 |
| 3,827,137 | 8/1974 | Schubach | 29/469 |
| 3,974,616 | 8/1976 | Beckley | 52/264 |
| 4,222,606 | 9/1980 | Brown et al. | 296/183 |
| 4,498,264 | 2/1985 | McCafferty et al. | 296/181 |
| 4,531,278 | 7/1985 | Boykin | 296/183 |
| 4,748,783 | 6/1988 | Labelle | 52/595 |
| 4,865,378 | 9/1989 | Filtri et al. | 296/197 |
| 4,940,279 | 7/1990 | Abott et al. | 296/183 |
| 5,066,067 | 11/1991 | Ferdows | 296/197 |
| 5,143,416 | 9/1992 | Karapetian | 296/183 |
| 5,195,800 | 3/1993 | Stafford et al. | 296/183 |
| 5,209,541 | 5/1993 | Janotik | 296/29 |

FOREIGN PATENT DOCUMENTS

94008838A1  4/1994  WIPO .................................... 296/29

*Primary Examiner*—Gary C. Hoge
*Attorney, Agent, or Firm*—Weintraub, DuRoss & Brady

[57] ABSTRACT

A modular frame structure for a cargo area of a truck includes rails, side structures and pre-fabricated assemblies. Each of the rails include elongated portions having interlocking seats for interdigitally engaging the rail portions. The interlocked rail portions also urge against and counterpose each other for reducing the stress on the interlocking seats. The rails are fastened or welded to the side structures and the pre-fabricated assemblies to complete the modular structure.

19 Claims, 6 Drawing Sheets

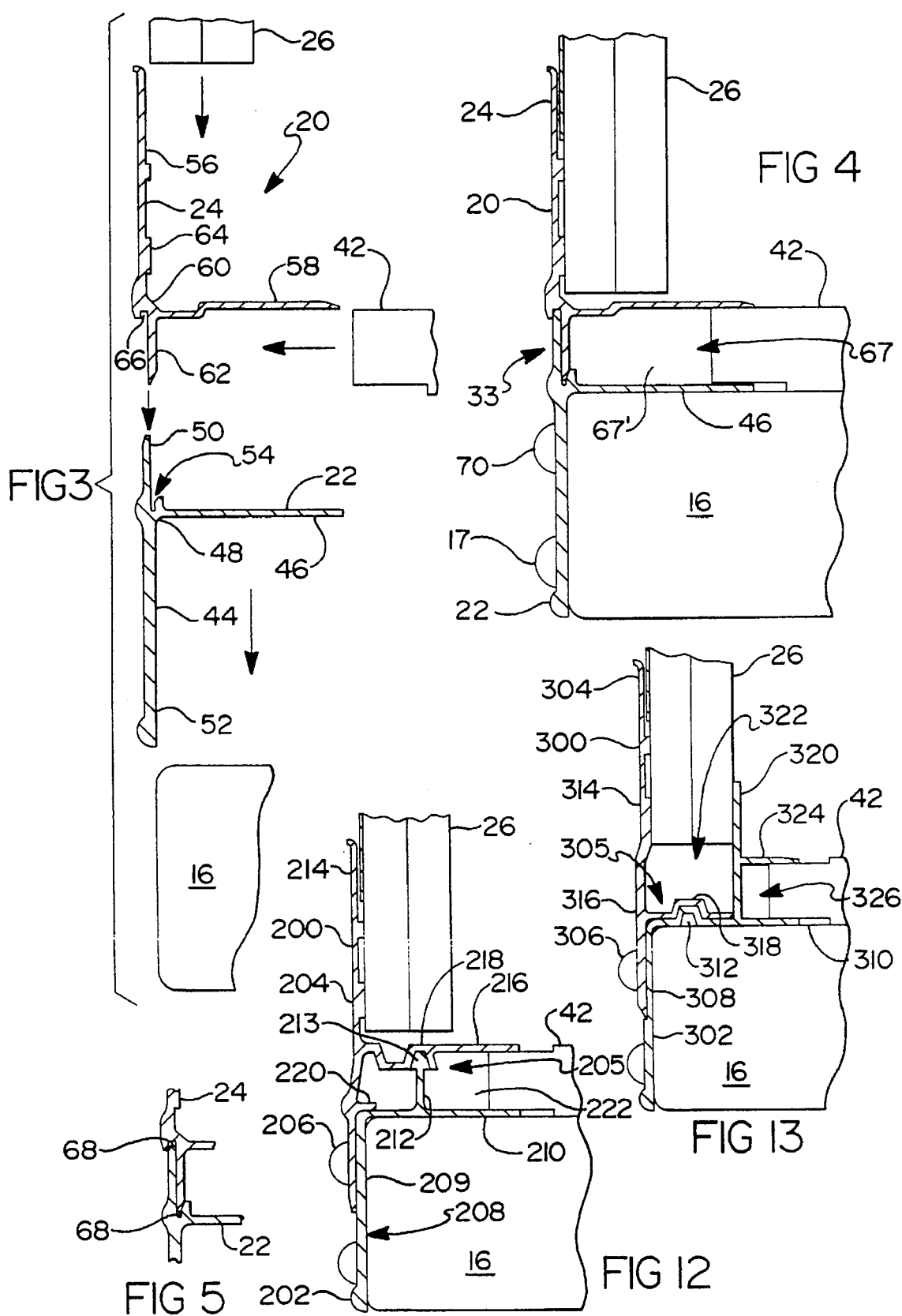

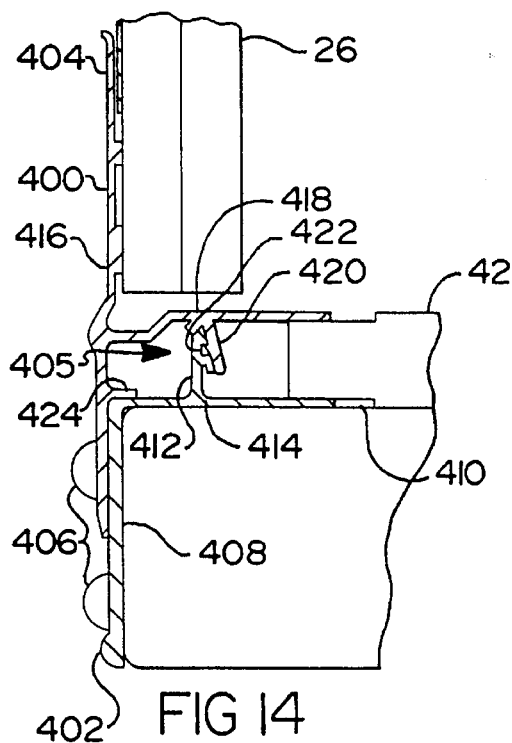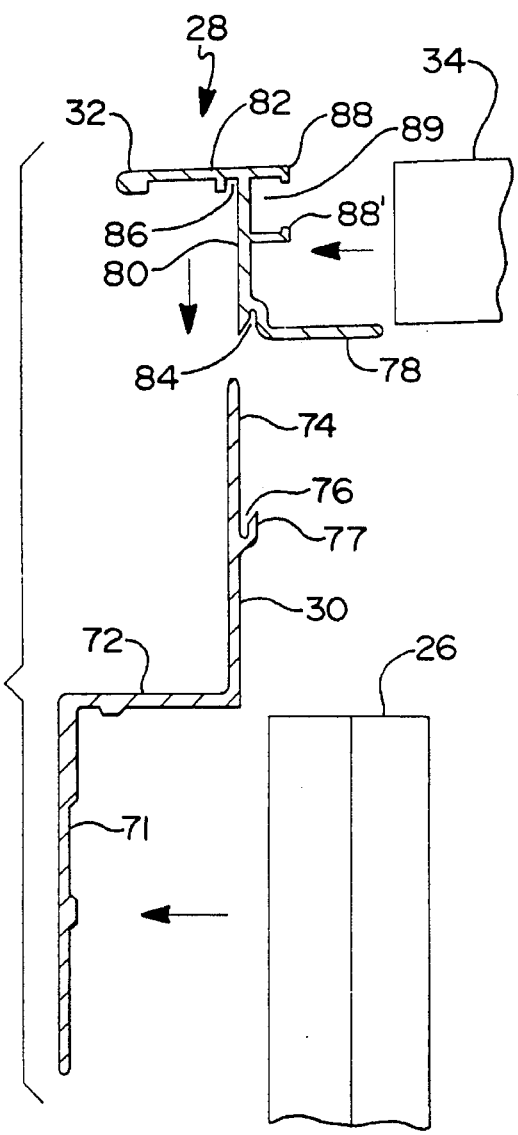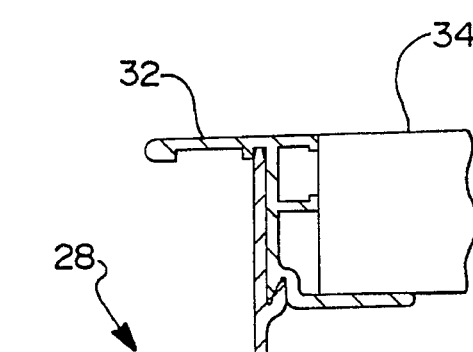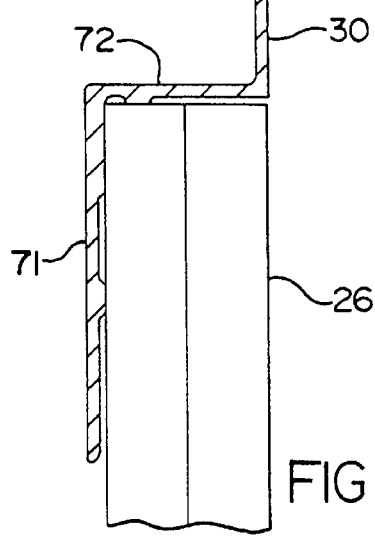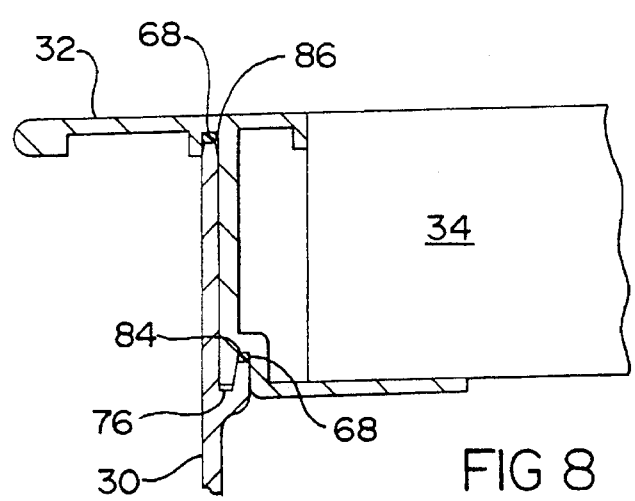

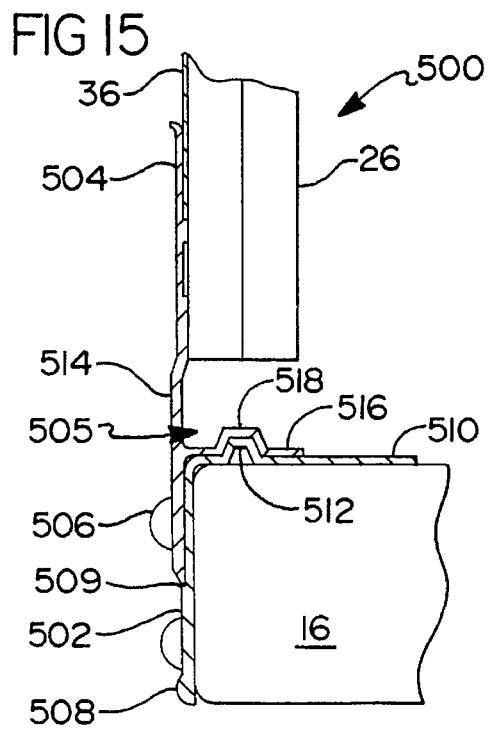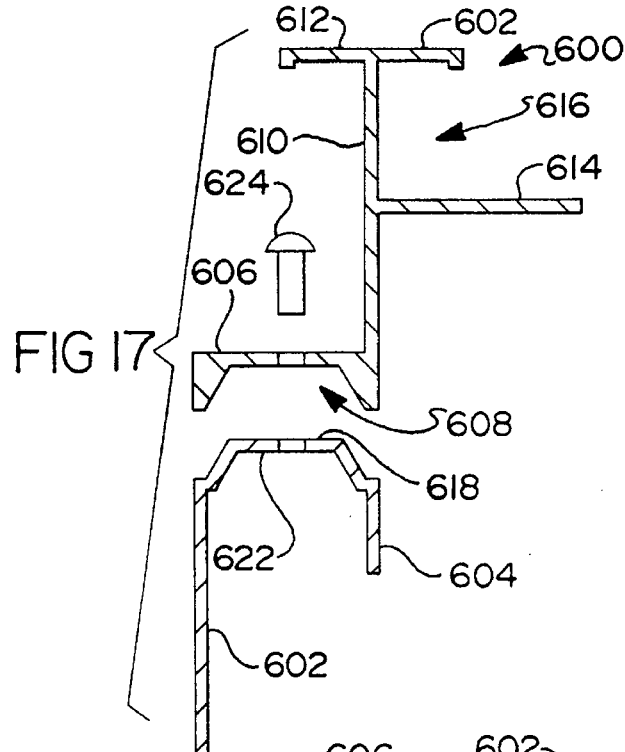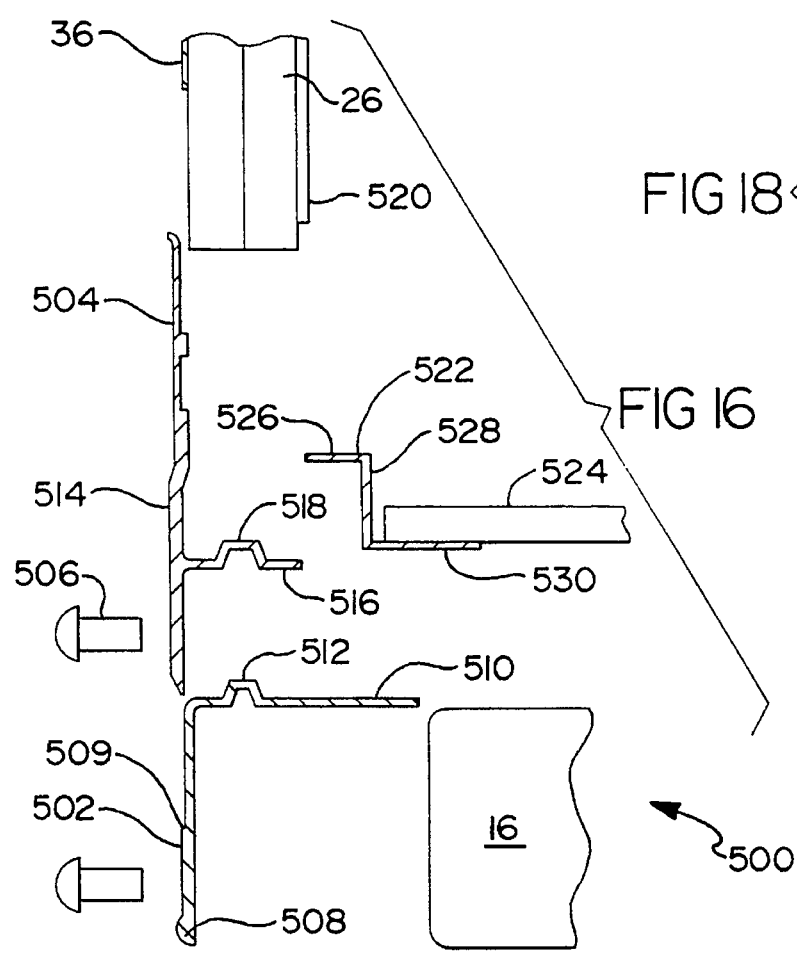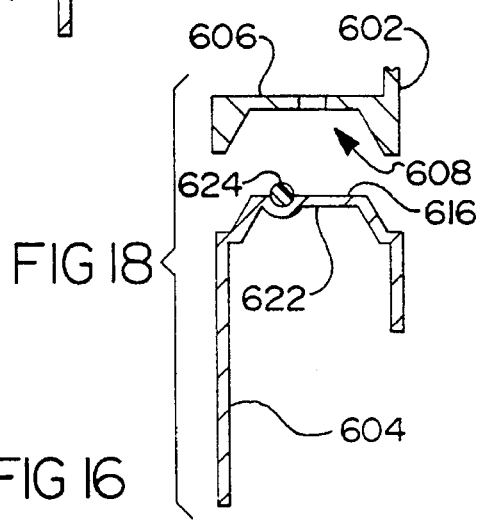

MODULAR TRUCK CARGO AREA BODY

I. FIELD OF THE INVENTION

The present invention relates to cargo area frame structures for motor vehicles. More specifically the present invention relates to modular frame structures for cargo areas of vehicles such as trucks, trailers and other similar vehicles.

II. DESCRIPTION OF THE PRIOR ART

Cargo area bodies for trucks have been in existence for many years. Many of the very first cargo area bodies were constructed from wood, such as demonstrated by the early Model "T" trucks produced by the Ford Motor Company.

As the technology matured, eventually, cargo area bodies were made from metal such as steel and aluminum. The metal walls were initially installed over wooden frames, but metal frames gradually replaced the wooden frames as lighter and inexpensive metal was developed.

Currently, most cargo area bodies for trucks are constructed either with lightweight metal roofs and walls which are mounted on lightweight frames or with plastic composite roofs and walls mounted on metal frames. The metal frames generally include rails, beams and side supports which are assembled to form a frame for a cargo area body. The rails, beams and side supports are traditionally attached together by welding or by fastening them together with rivets or the like. After the frame is assembled, the roofs and walls of the body are attached to the frame. The roof and walls are attached to the frame by using fasteners, such as rivets and screws, or by welding. Some walls and roofs are attached to the frame by a combination of fasteners and adhesives.

At one time, the cargo area bodies have been assembled piecemeal with one part or section at a time being produced and assembled. The parts were assembled in a fixture and, as previously stated, welded or fastened in place. Then, because of the uniformity of body cross-sections, this process was improved upon by providing modules or sections of the body and then assembling the modules together with fasteners or by welding, i.e. pre-fabrication. However, the parts of the modules were still fixtured and assembled by welding or with fasteners and the modules were further assembled by welding or with fasteners in fixtures.

A typical example of such modular construction is found in U.S. Pat. No. 5,066,067 issued to Ferdows. Ferdows discloses a pre-fabricated body or housing for buses, mobile homes and other commercial transportation vehicles. Ferdows provides modular sections with each modular section having a frame structure, an outside skin and an inside skin. Ferdows also teaches that when the inside skins are attached to the outside skins, the inside skins engage reinforcement beams mounted on the outside skins to hold the beams in place against the outside skins. Ferdows also discloses that the modular sections are joined together and to the chassis of the vehicle by fasteners.

Another example of modular construction is U.S. Pat. No. 3,827,137 issued to Schubach. Schubach discloses a method of assembling a pre-fabricated vehicle roof structure to the vehicle side walls. Schubach teaches that the roof structure has a plurality of flanges, one of which engages a seat disposed on the side walls to locate the roof. Schubach also teaches that the remaining flanges are attached to the side wall by fasteners.

U.S. Pat. No. 4,865,378 issued to Filtri et al discloses a modular vehicle body which is assembled from individual parts. Filtri teaches that the parts are assembled together by welding.

A further example of modular vehicle frame construction is found in U.S. Pat. No. 5,209,541 issued to Janotik, which discloses a sub-frame for a vehicle that is assembled from a base frame module and side frame modules. Janotik teaches that the base frame module has an elongated C-shaped side channel having elongated contact tabs. Each side frame module has an opposing elongated C-shaped bottom channel with elongated contact tabs. A connector provided with elongated slots on the top and bottom has adhesive applied thereto. The connector is inserted into the C-channel of the base frame with the contact tabs engaging the elongated slots. Next, Janotik teaches that the C-channel of the side frame module is positioned onto the connector, opposite the base frame module, with the contact tabs engaging the elongated slots. Thus, the two modules are held together by the connector and the adhesive.

Although the prior art teaches modular assemblies, it teaches limited applications of interlocking structures. The prior art primarily teaches the use of a single interlocking point, supplemented by some fastening device, for the locating and positioning of modules to facilitate assembly. However, interlocking joints have been otherwise used.

For example, U.S. Pat. No. 3,055,461 issued to DeRidder discloses using interlocking structural members to construct walls and panels. DeRidder teaches an interlocking joint made between two metal panels sufficiently flexible and malleable to permit bending. The panels interlock with a flange on an end of one panel engaging a slot on the end of the other panel. Also, a first L-shaped leg extending from the flange is initially bent away from a second L-shaped leg extending from the other panel. After the flange engages the slot, the first L-shaped leg is bent to overlay and urge against the second L-shaped leg. The legs are fastened together by welding or fasteners. DeRidder teaches that the overlaying L-shaped leg prevents the flange from escaping the notch, as long as pressure is maintained to hold the panels together, and the panels are fastened together.

Another example of interlocking joints is found in U.S. Pat. No. 3,356,398 issued to Nilssen. Nilssen discloses an interlocking device with multiple interlocking joints attached to concrete piles for joining the sections of the concrete piles together. Nilssen teaches that a metal plate having a V-section with undercut edges and a triangular section with undercut edges is attached to the end of the concrete piles. Nilssen teaches that to join the piles together, the triangle of a first plate is seated into the V-section of a second plate and the triangle of the second plate is seated into the V-section of the first plate. The undercut edges of the triangles engage the undercut edges of the V-shapes, thus interlocking the pile sections together. Nilssen teaches that the undercut edges carry the entire stress to hold the concrete piles together. However, Nilssen is limited to pilings that require additional support from outside sources, such as steel casings or dirt covering to counteract or prevent side stresses.

As previously noted, most interlocking joints used with modular construction are primarily used to provide limited locating or positioning assistance for the modules which are fastened together by welding or with fasteners. Interlocking joints which experience stress during assembly are supplemented by additional assistance such as welding, adhesives or fasteners at the joints. Substantial fixturing, extra labor, time and expense is required to do the many additional assembly steps for welding or fastening the interlocking joints of the modular parts or sections.

It is to be appreciated that the use of interlocking joints for modular construction of vehicular cargo bodies has not heretofore been provided. Yet, a modular cargo body frame which is easy to assemble using interlocking joints which do not require extensive fixturing, welding or any other type of fastening to support the interlocking joints of the modules and reduce stresses at the joints would substantially reduce labor costs, time of construction and cost of materials. It is this to which the present invention is directed.

SUMMARY OF THE PRESENT INVENTION

The present invention provides an improved modular structure defining the cargo area of a truck or similar vehicle which is easily and quickly assembled using interlocking sections. The modular structure for the cargo area is assembled to a sub-structure which is attachable to and mountable on an undercarriage of a truck. The structure hereof includes:

(a) first and second spaced apart, substantially co-planar bottom rails, each bottom rail comprising:
 (1) a lower rail portion attachable to the sub-structure;
 (2) an upper rail portion which lockingly engages the lower rail portion;
 (3) means for engaging the lower rail portion and the upper rail portion;

(b) first and second spaced apart, substantially co-planar top rails one top rail being associated with a corresponding bottom rail, each top rails comprising:
 (1) a side rail portion;
 (2) a roof rail portion engaging the side rail portion;
 (3) means for engaging the side rail portion and the roof rail portion;

(c) a roof structure extending between the top rails; and (d) at least one side wall support extending between each associated bottom rail and top rail and secured thereto.

The modular cargo body frame structure provides the underlying support structure for outside walls of the cargo body and any door assemblies. The frame structure carries the weight of the roof structure, the walls and door assemblies which add a great deal of stress at the interlocking joints where the lower rail portion and the upper rail portion of the bottom rails engage each other and where the side rail portion and the roof rail portion of the top rails engage each other.

The stress is handled by providing each of the bottom rails and the top rails with interlocking joints which define the means for engaging and which permit easy assembly without the need for fixturing or clamps and fastening devices. The means for engaging comprise interlocking seats which have portions that urge against and are counterposed to each other to distribute stress. The bottom rails are attached to the sub-structure by welding or with fasteners such as rivets.

The lower rail portion of the bottom rail is an elongated, essentially T-shaped rail, extending rearwardly of the vehicle cabin and having at least one seat formed therein engages and interlocks with the upper rail portion. The upper rail portion also is an elongated essentially T-shaped rail having at least one seat formed therein which engages and interlocks with the lower rail portion. The lower rail portion and upper rail portion are counterposed to each other to reduce stress on the seats.

The at least one side wall support is attached to the bottom rails by welding or fasteners. The side wall supports are essentially elongated Z-shaped rails which extend from the bottom rails to the top rails.

The side rail portion of the top rails is essentially an elongated Z-shaped rail having at least one seat formed therein to engage and interlock with the roof rail portion of the top rail. The roof rail portion of the top rails preferably is essentially a Z-shaped rail having at least two seats formed therein to interdigitally engage and interlock with the side rail portion. The side rail portion and the roof rail portions are counterposed to each other to reduce stress on the seats.

For weather-proofing, caulking is traditionally used at the interlocking joints. However, the seats in the rails may be designed to receive seals, such as a flexible elongated O-ring, instead of caulking. The seals are installed in the seats before the rail portions are assembled.

The roof structure is preferably pre-assembled before assembly to the top rails. After assembly of the roof structure, the front wall panels, the side wall panels, interior wall panels, door frame assemblies and doors are assembled to the modular frame.

The present invention will be better understood with reference to the following detailed discussion and to the accompanying drawings, wherein like reference numbers refer to like elements and in which:

BRIEF DESCRIPTION OF DRAWINGS

FIG. 3 is an exploded cross-sectional view of a first embodiment of a bottom rail of the present invention;

FIG. 4 is a cross-sectional view of the bottom rail of FIG. 3, as assembled;

FIG. 5 is a partial cross-sectional view of the bottom rail of FIG. 4;

FIG. 6 is an exploded cross-sectional view of an embodiment of a top rail of the present invention;

FIG. 7 is a cross-sectional view of the top rail of FIG. 6 as assembled;

FIG. 8 is a partial cross-sectional view of the top rail of FIG. 6;

FIG. 12 is a cross-sectional view of a third embodiment of a bottom rail in accordance with the present invention;

FIG. 13 is a cross-sectional view of a fourth embodiment of a bottom rail in accordance with the present invention;

FIG. 14 is a cross-sectional view of a fifth embodiment of a bottom rail according to the present invention;

FIG. 15 is a cross-sectional view of a sixth embodiment of the bottom rail in accordance with the present invention;

FIG. 16 is an exploded cross-sectional view of the sixth embodiment of the bottom rail of FIG. 5.

FIG. 17 is an exploded, cross-sectional view of an alternative embodiment of the top rail in accordance with the present invention;

FIG. 18 is a partial cross-sectional view of the top rail of FIG. 17;

DETAILED DESCRIPTION OF THE PREFERRED EMBODIMENTS

Figure 1:
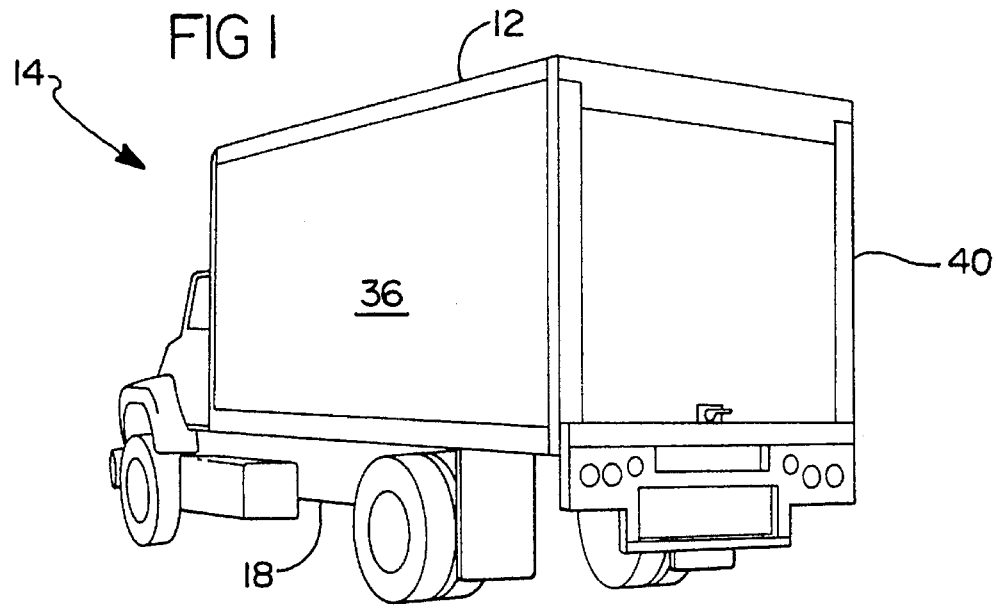
FIG. 1 is a perspective view of a truck and cargo area body which utilizes the present invention.

At the outset, it is to be noted that in constructing a cargo body in accordance herewith, that the bottom rails extend rearwardly of the vehicle or truck cab on opposite lateral sides thereof. Likewise, the same is true of the top rails. Also, on each side of the cargo body, there is one bottom rail and one top rail. Since each bottom rail and each top rail are similarly constructed, only one of each will be described for purposes of clarity.

Now with reference to the drawings and, in particular, FIGS. 1–8, there is depicted therein a first embodiment of a modular structure or module in accordance with the present invention, generally denoted at 10, for a cargo area body 12 of a truck 14 which is mounted on a sub-structure 16 attached to an undercarriage 18 of the truck 14. In its totality, the modular structure 10 hereof generally comprises:

(a) first and second spaced apart, substantially co-planar bottom rails, each bottom rail comprising:
  (1) a lower rail portion attachable to the sub-structure;
  (2) an upper rail portion which engages the lower rail portion;
  (3) means for engaging the lower rail portion and the upper rail portion;
(b) first and second spaced apart, substantially co-planar, top rails, one upper rail being associated with a corresponding bottom rail, each upper rail comprising:
  (1) a side rail portion;
  (2) a roof rail portion which engages the side rail portion;
  (3) means for engaging the side rail portion and the roof rail portion;
(c) at least one side wall support extending between each associated bottom rail and upper rail and secured thereto; and
(d) a roof structure extending between the upper rails.

As noted, the modular frame structure 10 for the cargo area body 12 employs a substructure 16, such as a frame or the like, for securing the module to the undercarriage 18 of the truck 14 when installed, the module defines a support frame for typical side walls 36, 36', front wall 38, a door frame assembly 40 and floor assembly 42, ordinarily found in a cargo body. Each of the above units is assembled to the modular frame structure 10 along with any other additional optional equipment.

More particularly and referring now to FIGS. 3, 4 and 5, there is shown therein a first embodiment of a bottom rail 20 which is secured to the sub-structure 16 by means for fastening, such as a fastener 70, which may comprise a rivet, screw, etc. Of course, the sub-structure is secured to the undercarriage by any suitable mode.

The bottom rail 20 comprises a lower rail portion 22, secured to the sub-structure 16, an upper rail portion 24 which interlockingly engages the lower rail portion 22 and means for engaging which engages the lower rail portion 22 and the upper rail portion 24.

The lower rail portion 22 is essentially an elongated T-shaped rail having an inwardly directed first cross-member 44 and a first leg member 46 integrally formed therewith. The first leg member 46 extends from and is essentially normal to the first cross-member 44. The first leg member 46 intersects the first cross-member 44 at an intersecting point 48, such that a first portion 50 of the cross-member 44 extends upwardly from the intersecting point 48. Likewise, a longer second portion 52 of the first cross-member 44 extends downwardly from the intersecting point 48.

The upper rail portion 24 is essentially an elongated T-shaped rail having an upwardly extending or second cross member 56 and a second leg member 58 integrally formed therewith. The second leg member 58 is essentially normal to the first cross-member 56. The second leg member 58 intersects the cross-member 56 at a point 60 such that a first portion 62 thereof extends downwardly from the intersection point 60 and a longer second portion 64 thereof extends upwardly from the intersection point 60.

The means 21 includes an elongated first seat 54 formed in the lower rail portion 22 proximate the intersecting point 48. The seat 54 is adapted to receive and interdigitally engage the upper rail portion when the two rail portions 22, 24 are assembled.

The means 21 also includes an elongated second seat 66 formed in the cross-member 56 of the upper rail portion 24 proximate the intersecting point 60. The second seat 66 is adapted to receive and interdigitally engage the cross-member 44 of the lower rail portion 22.

It is thus seen that the means for engaging 21 defines an interlocking joint. As shown, when the end of the cross-member 56 of the upper rail portion 24 is disposed in the first seat 54 and the end of the cross-member 44 of the lower rail portion 22 is disposed in the second seat 66 of the upper rail portion 24, the first portion 50 of the cross-member 44 urges against the first portion 62 of the cross-member 56. Thus, the lower rail portion 22 interlocks with the upper rail portion 24 and their respective cross-members 44, 56 are counterposed to each other. This greatly reduces the stress on the seats 54, 66 to maintain the rails 22, 24 in position when the cargo body 12 is assembled. Also, the second cross-member 56 of the upper rail portion 24, the first leg member 46 of the lower rail portion 22, and the second leg member 58 of the upper rail portion 24 cooperate to form an elongated seating channel 67 for receiving and seating the sides of a floor structure 42. It is to be noted that a gap 67' is provided in the channel 67 which compensates for any expansion and/or contraction of the floor structure 42.

As shown in FIG. 5, the interlocking joint or means for engaging 21 is normally sealed. Preferably, the seal is an elongated flexible seal 68 generally O-shaped and made from any weather impervious material such as rubber or plastic. The seal 68 is inserted into and prior to assembling the two rails 22, 24 together. The seals 68 seal the joints from inclement weather such as rain, snow, etc. and are secured in the seats 54, 66 when the cross-members 44, 56 engage the seats 54, 66.

Optionally, the interlocking joint may be sealed with a caulking material. However, this process is labor intensive and time consuming and requires regular maintenance.

Figure 2:
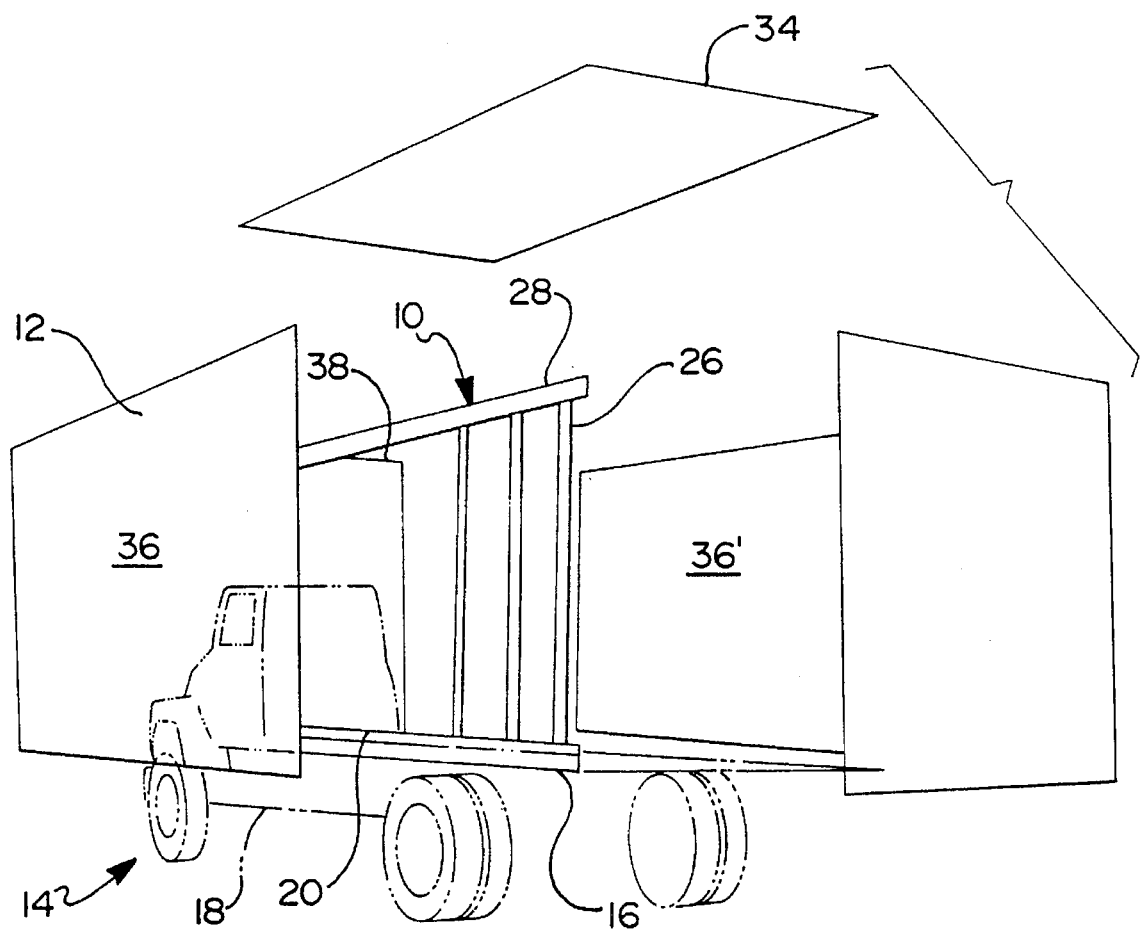
FIG. 2 is an exploded perspective view of the truck and cargo area body hereof.

The lower rail portion 22 of the bottom rails 20 mounts onto the sub-structure 16 whereby the second portion 52 of the first cross-member 44 and the first leg member 46 urge against the sub-structure 16. When the lower rail portion 22 is in position, it is fastened to the sub-structure 16 by any suitable means, as noted above. Therefore, the upper rail portion 24 is then assembled to the lower rail portion 22. As shown in FIGS. 2, 3 and 4, a plurality of side wall supports 26 are secured to and extend upwardly from the upper rail portion 24. The supports are secured by means, such as suitable fasteners commonly known in the art, or by welding or the like. Preferably, the lower ends of the side wall supports 26 are attached to the second portion 64 of the upper rail portion 24. The side wall supports 26 extend upwardly from the bottom rails 20 and are secured to the top rails 28, as subsequently described.

Referring now to FIGS. 6–8, there is shown a top rail 28 in accordance herewith. The top rail 28 includes a side rail portion 30, a roof rail portion 32 and means which engages and interlocks the side rail portion and the roof rail portion.

The roof rail portion 32 is essentially a Z-shaped rail having a second lower leg member 78, a second medial member 80, integral with the lower leg member 78 and essentially normal thereto, and an upper leg member 82, integral with the medial member 80 and essentially normal thereto.

A wire wall 88 is integrally formed with the second medial member 80 and extends essentially normal therefrom. The wire wall 88 is aligned with the second upper leg member 82. A second wire wall 88' may also be provided which extends from the second medial member 80 parallel with the first wire wall 88. The wire walls 88, 88' and the second medial member 80 form a channel 89 for carrying the electrical wiring which is installed on the cargo area body 12.

The side rail portion 30 is essentially an elongated Z-shaped rail having a first lower leg member 71, a first medial member 72 integral with the first lower leg member 71 and essentially normal thereto, and a first upper leg member 74, integral with the medial member 72 and essentially normal thereto.

The means 33 includes an elongated first seat 76 formed therein, provided in the side rail portion 30, on the first upper leg member 74 of the side rail portion 30. The first seat 76 receives and interdigitally engages the roof rail portion 32 when assembled, as described below.

The means 33 for engaging the side rail portion 30 and the roof rail portion 32 also includes an elongated second seat 84 formed in the roof rail portion 32 and which receives a tang 77 formed on the first upper leg 74 of the side wall portion 30, as shown. The roof rail portion 32 also engages the first seat 76 of the side rail portion 30. The second seat 84 is located at the intersection of the second lower leg member 78 and the second medial member 80. The roof rail portion 32 also has a third seat 86 formed therein which seatingly receives the end of the first upper leg member 74 of the side rail portion 30. The seat 86 is located at the intersection of the second medial member 80 and the second upper leg member 82, as shown.

As shown particularly in FIG. 7, the side rail portion 30 of the top rail 28 is mounted to the upper end of the side wall support structures or beams 26. The beams urge against the first lower leg member 71 and the first medial member 72. The side rail portion 30 may be attached to the side wall supports 26 with fasteners such as rivets or screws or by welding.

After the side rail portion 30 is secured to the side wall supports 26, the roof rail portion 32 is engaged and interlocked with the side rail portion 30 via the means 33. In accordance herewith, the second seat 84 of the roof rail portion 32 interdigitally receives the tang 77, while the end of the medial member 80 projects into the first seat 76 of the side rail portion 30. At the same time, the second seat 86 of the roof rail portion 32 receives and interdigitally engages the end of the first upper leg member 74 of the side rail portion 30. When the side rail portion 30 and the roof rail portion 32 are interlocked, the second medial member 80 of the roof rail portion 32 and the first upper leg member of the side rail portion 30 are counterposed to and urge against each other to reduce the stress at the joints defined by the seats 76, 84, 86.

As shown in FIG. 8, the top rail 28 may be weather-proofed similar to the bottom rail 20. The weather-proofing or sealing may be accomplished using elongated O-ring flexible seals, as previously described, or by caulking. The seals are preferably inserted into the seat 84 and the third seat 86 of the roof rail portion 32 before it is assembled to the side rail portion 30. When the rails 30, 32 are interlocked, the seals seal the joint against weather, such as rain, snow, etc.

The roof structure 34 is mounted to the roof rail portions 32 of the top rail 28 to complete the modular frame structure 10. The roof structure 34 is prefabricated prior to assembly and is mounted as a unit. The roof structure 34 may be attached to the top rails with fasteners such as rivets, screws, etc. or by welding.

Figure 9:
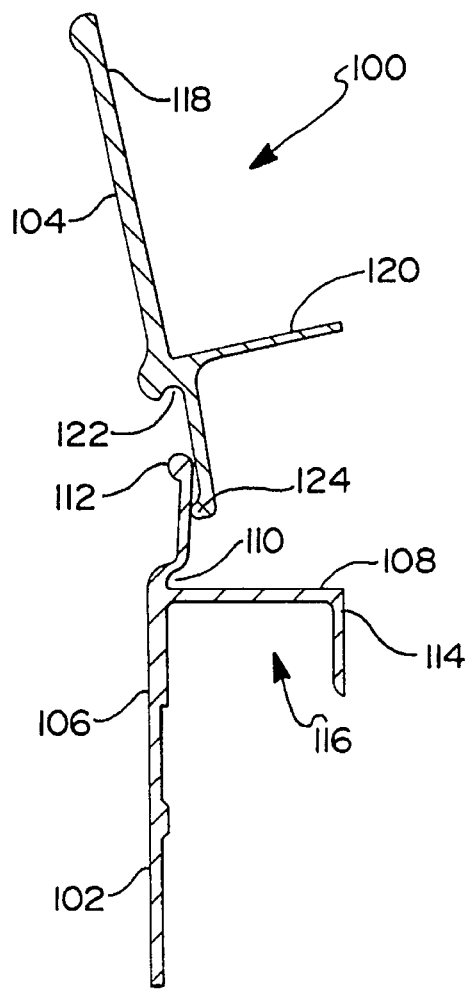
FIG. 9 is an exploded cross-sectional view of a second embodiment of a bottom rail of the present invention.
Figure 10:
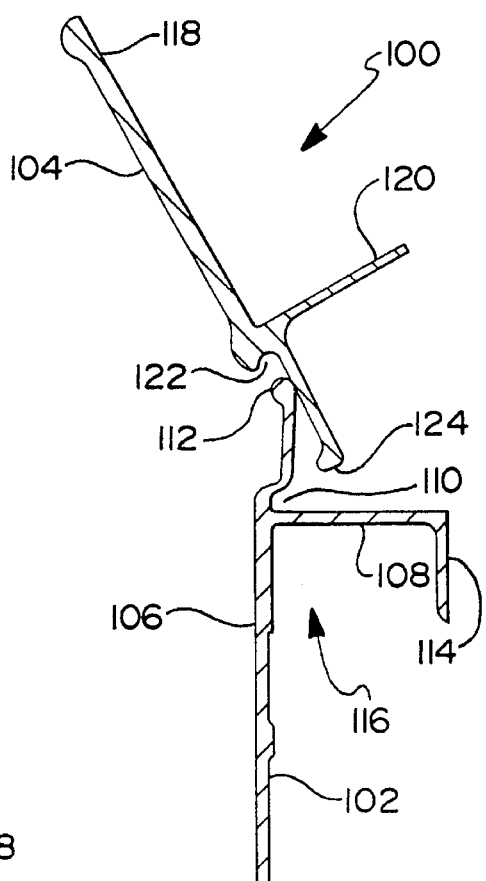
FIG. 10 is an exploded cross-sectional view of the second embodiment of the bottom rail.
Figure 11:
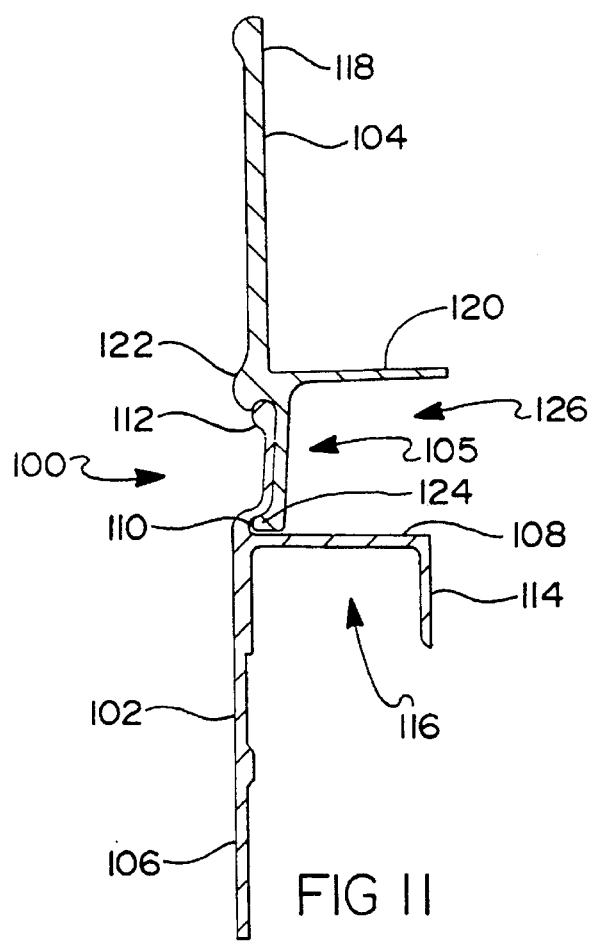
FIG. 11 is a cross-sectional view of the second embodiment of the bottom rail of the present invention.

Referring now to FIGS. 9, 10 and 11, there is shown therein a second embodiment of a bottom rail, generally at 100. The rail 100 includes a lower rail portion 102, an upper rail portion 104 and means 105 for interlockingly engaging the lower rail portion 102 and the upper rail portion 104. The lower rail portion or lower portion 102 is essentially an elongated T-shaped rail having a first, inwardly extending cross-member 106 and a first leg member 108 integral with the first cross-member and essentially normal thereto. The lower rail portion 102 also has a flange 114 integral with and extending from the first leg member 108. The flange 114 is essentially normal to the first leg member 108 and parallel with the first cross-member 106. The first cross-member 106, first leg member 108 and flange 114 cooperate to form a channel 116 which receives the sub-structure 16 when the bottom rail 100 is assembled thereto.

The upper rail portion or upper portion 104 is essentially a T-shaped rail having a second cross-member 118 and a second leg member 120. The second leg member 120 is integral with the second cross-member 118 and essentially normal thereto.

The means 105 for engaging the lower rail portion 102 and the upper rail portion 104 includes an elongated first seat 110 is formed in the first cross-member 106 proximate the intersection of the first cross-member 106 and the first leg member 108. The seat receives and interdigitally engages the upper portion 102. The lower portion 102 has a first hook 112 disposed on the cross-member 106 which engages the upper rail portion 104 when the rail portions 102, 104 are assembled. The means 105 also includes an elongated or second seat 122 formed in the second cross-member proximate the intersection of the second cross-member 118 and second leg member 120 for securely receiving the hook 112. The second cross-member 118 of the upper rail portion 104 has a second hook 124 formed thereon which nests in seat 110 of the lower rail portion 102.

The bottom rail 100 is mounted to the sub-structure 16 in the same manner as described with respect to the first embodiment. Also, the lower rail portion 102 and the upper rail portion 104 interlock similarly to that of the first embodiment, but with the hook 102 nesting in the seat 110. Thus, the upper rail portion 104 interdigitally engages the first seat 110 of the lower rail portion 102 and the lower rail portion 102 interdigitally engages the second seat 122 of the upper rail portion 104. When the rail portions 102, 104 are assembled, the first cross-member 106 and the second cross-member 118 are counterposed to each other. This relieves the stress on the interlocking seats 110, 122. Also, the first leg member 108 of the lower rail portion 102 and the second cross-member 118 and the second leg member 120 cooperate to form an elongated channel 126 for receiving the floor structure 42 at assembly.

In FIG. 12, there is shown a third embodiment of the bottom rail, at 200. The rail 200 includes a lower rail portion 202, an upper rail portion 204 and means 205 for interlockingly engaging the lower rail portion 202 and the upper rail portion 204. The lower rail portion 202 is secured to the sub-structure 16 by any suitable means for fastening, such as described hereinabove. Also, the upper rail portion 204 overlaps the lower rail portion and is secured to the sub-structure by fasteners 206, as shown. By utilizing the fastener 206, the overlapping portion of the upper rail is likewise secured to the lower rail leg 207.

The lower rail portion 202 is essentially an elongated L-shaped rail and includes a first downwardly depending leg member 209 and a second inwardly directed leg member 210 integral with the first leg member 208 and essentially normal thereto.

The upper rail portion 204 is essentially a T-shaped rail and includes a cross-member 214 and an integral third leg member 216 substantially normal thereto. The upper rail portion 204 also has an inwardly projecting locating flange 220 integral with the cross-member 214 and extending therefrom substantially parallel to the third leg member 216. The locating flange 220 locates and positions the upper rail portion 204 with respect to the lower rail portion 202 when assembled. The second leg member 210 and the seating flange 212 of the lower rail portion 202 and the third leg member of the upper rail portion cooperate to form an elongated channel 222, at assembly, for receiving the sides of the floor structure.

The means 205 for engaging the lower rail portion 202 and the upper rail portion 204 includes an elongated seating flange 212 integral with the second leg member 210 of the lower rail portion 202 and extending upwardly therefrom. The seating flange 212 is essentially normal to and approximately medial the second leg member 210 and has a boss 213 formed thereon at the terminus thereof. The means 205 also includes an elongated seat 218 formed in the third leg member 216 of the upper rail portion 204 to receive and engage the boss 213.

After the bottom rail 200 is assembled to the sub-structure 16, the balance of the modular frame 10 is assembled as described above.

In FIG. 13, there is depicted a fourth embodiment of a bottom rail and generally denoted at 300. The rail 300 includes a lower rail portion 302, an upper rail portion 304 and means 305 for engaging the lower rail portion 302 and the upper rail portion 304. The bottom rail 300 is attached to the sub-structure 16 by suitable fasteners 306 or by welding or the like. The lower rail portion 302 is essentially an elongated L-shaped rail having a first leg member 308 and an inwardly extending integral second leg member 310 essentially normal to the first leg member 308.

The upper rail portion 304 is essentially an elongated T-shaped rail having a cross-member 314 and a third leg member 316 integral with and essentially normal to the cross-member 314. The third leg member 316 also has a first flange 320 integral therewith and extending upwardly substantially parallel to the cross-member 314. The third leg member 316 and the first flange 320 cooperate to form an elongated channel 322 for receiving the side wall supports 26.

A second flange 324 is integrally formed with the first flange 320 and is essentially parallel with the third leg member 316. The second flange 324 is located substantially medial the first flange 320. The third leg member 316, the first flange 320 and the second flange 324 cooperate to form an elongated notch 326 for receiving a floor assembly.

The means 305 includes an upwardly extending interlocking projection 312 formed integrally with the second leg member 310 and disposed essentially medial thereto. The projection 312 interlockingly engages the upper rail portion 304. As shown, the means 305 also having an elongated seat 318 formed in the leg member 316 substantially medially thereof which receives the projection 312 of the lower rail portion 302.

In FIG. 14, there is shown a fifth embodiment of a bottom rail 400 and which includes a lower rail portion 402, an upper rail portion 404 and means 405 for engaging the lower rail portion 402 and the upper rail portion 404. The bottom rail 400 is attached to the sub-structure 16 by any suitable means such as fasteners 406, such as, for example, rivets, screws, etc. or by welding or the like. The upper rail portion 404 is attached to the substructure through lower rail portion 402 via the fasteners 406, or the like, as shown. The lower rail portion 402 is essentially an elongated L-shaped rail having a first leg member 408 and a second leg member 410 integral with the first leg member 408. The second leg member 410 is essentially normal to the first leg member 408.

As shown, the upper rail portion 404 is essentially an elongated T-shaped rail having a cross-member 416 and an integral third leg member 418 essentially normal to the cross-member 416. The third leg member 418 is preferably substantially normal to the cross-member 416.

The means 405 for engaging the lower rail portion 402 and the upper rail portion 404 includes an elongated seating flange 412 formed on the second leg member 410 and extending upwardly therefrom, substantially normal thereto. The seating flange 412 is located approximately medial the second leg member 410 and has an elongated notch 414 formed therein for receiving the upper rail portion 404. The means 405 also includes an elongated inverted V-shaped seat 420 integrally formed with the third leg member 418 of the upper rail portion 404 for receiving the seating flange 412 of the lower rail portion 402. The seat 420 is located substantially medial the third leg member 418 and has a hook 422 formed thereon for engaging the notch 414 of the seating flange 412.

The cross-member 416 has an elongated locating flange 424 integral thereto and essentially normal to the leg member 418. The locating flange 424 locates and positions the upper rail portion 404 on the lower rail portion 402 when the rail portions 402, 404 are assembled. Also, at assembly, the hook 422 of the upper rail portion 404 is received in and engages the notch 414 of the lower rail portion 402. After the rail portions 402, 404 are assembled, the upper rail portion 404 is attached to the lower rail portion 402. The second leg member 410 and the seating flange 412 of the lower rail portion 404 cooperate to form an elongated channel 424 for receiving the sides of the floor structure. After the bottom rail 400 is assembled to the sub-structure 16, the balance of the modular frame 10 is assembled as previously described.

Likewise, a seal, such as an O-ring seal 68 or 626, may be emplaced in the indentation to prevent any undesirable elements from getting therepast.

Referring to FIGS. 15 and 16, there is shown therein a fifth and most preferred embodiment of a bottom rail for use herein and generally denoted at 500. The bottom rail 500 includes a lower rail portion 502, an upper rail portion 504, and means 505 for engaging the lower rail portion and the upper rail portion. The bottom rail is attached to the sub-structure 16 by suitable fasteners 506 such as rivets, screws, etc., or by welding or the like. The lower rail portion 502 is essentially an elongated L-shaped rail having a first leg member 508 and an inwardly extending second leg member 510 integral with and disposed substantially normal thereto.

Also, the first leg member 508 has an elongated step 509 formed therein approximately medially thereof for aligning the upper rail portion 504 at assembly.

The upper rail portion 504 is essentially an elongated T-shaped rail having a cross-member 514 and an arm member 516 integral with and substantially normal to the cross-member 514. The arm 516 is provided substantially medially of the cross-member 514 and extends inwardly therefrom.

The means 505 for interlockingly engaging the lower rail portion and the upper rail portion includes an elongated indentation 512 formed in the second leg member 510 of the lower rail portion 502 proximate the intersection of the second leg member 510 and the first leg member 508. The indentation 512 nestingly receives the upper rail portion 504, as shown. The means for engaging the lower rail portion and the upper rail portion also includes an elongated seat 518 formed in the arm member 514 of the upper rail portion 504 corresponding to and for receiving the indentation 512 of the lower rail portion 502, as shown.

In use, the bottom rail member 502 is assembled to the sub-structure 16 and then fastened thereto by suitable fasteners 506 such as rivets, screws, etc. or the like. Likewise, the bottom rail may be secured thereto by welding or the like.

When the upper rail portion 504 is secured to the bottom rail portion 502, the arm 516 of the upper rail portion urges against the second leg 510 of the bottom rail portion causing the seat 518 of the arm 516 to engage the indentation 512 of the second leg 510. A portion of the cross-member 514 extending below the arm 516 simultaneously urges against the first leg member 508 of the bottom rail portion and aligns with the step 509 formed therein. A fastener 507 such as a rivet, screw, etc. may be used to secure the upper rail portion 504 to the bottom rail portion 502 and the sub-structure. Thus, in many respects, the bottom rail construction becomes self-aligning, thereby eliminating the need for fixturing.

Referring now to FIGS. 17 and 18, there is depicted therein an alternate embodiment of a top rail in accordance with the present invention and generally denoted at 600. The top rail 600 comprises an upper member 602 and a lower member 604. The members 602 and 604 matingly engage to define the top rail 600, as shown. The upper member 602 comprises a first leg 606 having an embossment 608 provided therein. The embossment 608 defines a seat for the lower member 604, as subsequently detailed.

The upper member 602 also includes a second or medial leg 610 and a third leg 612. The leg 612 is substantially parallel to and overlies the first leg 606, as shown. The medial leg is preferably normal to both the upper and lower legs. Also, the member 602 is preferably a unitary member.

An arm 614 projects inwardly from the leg 610 substantially normal and medial thereto. The arm 614 cooperates with the upper leg 612 to define a gap or channel 616 therebetween. The gap 616 enables emplacement for electrical wiring or the like therealong.

The lower member 604 essentially comprises an L-shaped member having first and second legs 618,620, respectively. The first leg 618 has an indentation 627 provided therein which corresponds to the embossment 608 of the upper member 602 such that it may seat thereatop to thereby interengage the upper and lower members 602 and 604. If desired, a fastener 624, such as a bolt, rivet or the like, may be inserted through the cooperating embossment 608 and indentation 622 to secure the two members together.

As shown in FIG. 18, the top rail 600 may be weatherproofed by using an elongated O-ring flexible seal 624, as previously described, or by caulking. The seal 624 is preferably inserted into the indentation 622 of the lower member 604 before it is assembled to the upper member 602. When the members 602,604 are united, the seal 626 seals the joint against weather, such as rain, snow, etc.

Figure 20:
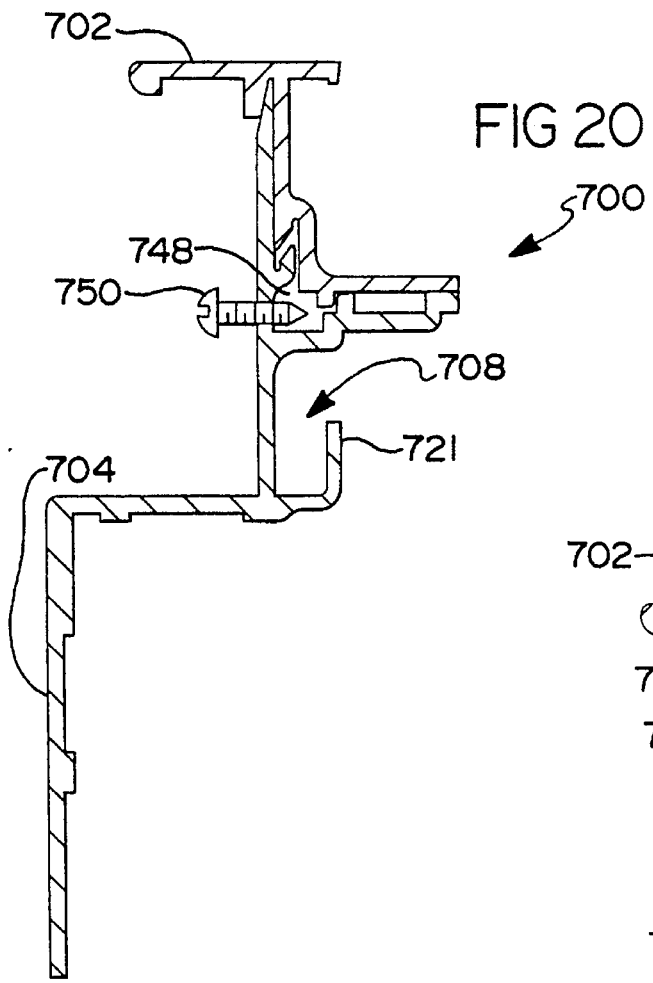
FIG. 20 is a cross-sectional view of the top rail of FIG. 19, as assembled.
Figure 19:
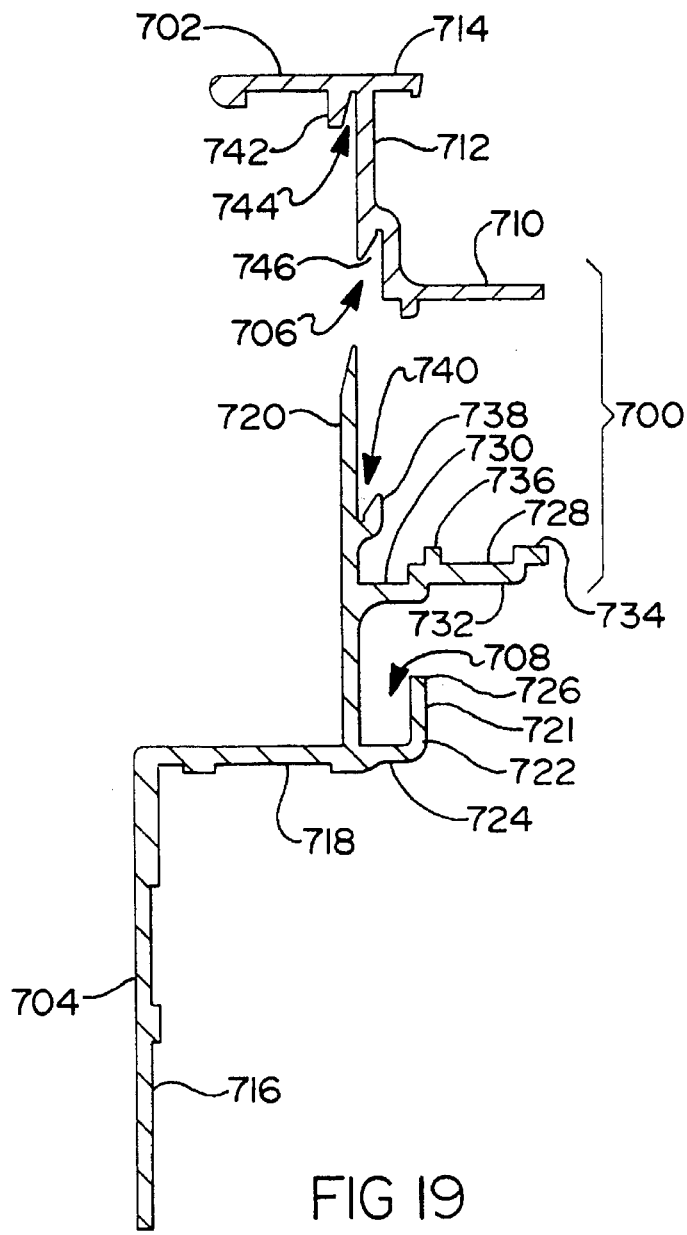
FIG. 19 is an exploded, cross-sectional view of a third embodiment of the top rail in accordance with the present invention.

Referring to FIGS. 19 and 20, there is depicted a third embodiment of the top rail in accordance with the present invention generally denoted at 700. The top rail 700 comprises a roof rail portion 702, a side rail portion 704 and means 706 for engaging and interlocking the roof rail portion 702 and the side rail portion 704. This embodiment is similar in many aspects to the first embodiment of the top rail 28. However, this embodiment of the top rail 700 provides for electrical wiring (not shown) to be installed on the side rail portion 704 which has a channel 708 formed therein for receiving the wire.

The roof rail portion 702 is essentially an elongated Z-shaped rail having a lower leg member 710, a medial member 712, integral with the lower leg member 710 and essentially normal thereto, and an upper cross member 714 which is integral with the medial member 712 and essentially normal thereto.

The side rail portion 704 is essentially an elongated Z-shaped rail having a lower leg member 716, a medial member 718, integral with the lower leg member 716 and essentially normal thereto and an upper leg member 720 which is integral with the medial member 718 and essentially normal thereto.

The side rail portion 704 also includes means 721 for receiving and supporting electrical wiring. The means 721 for receiving and supporting wiring preferably comprises a wire rack 722 which is L-shaped and includes a base member 724 integrally formed with and extending essentially normal from the upper leg member 720. The base member 724 is aligned with the medial member 718. The wire rack 722 also has a flange member 726 integral with the base member 724 which extends upward essentially normal therefrom. The upper leg member 720, the base member 724 and the flange member 726 cooperate to define the channel 708 for receiving wiring.

The upper leg member also has an arm 728 extending inwardly therefrom approximately medial thereof. The arm 728 is integral with the upper leg member 720 and essentially normal thereto. The arm 728 includes a first planar portion 730 attached to the upper leg member 720, a medial planar portion 732 disposed upon, parallel with and unitarily formed with the first planar portion 730 and a second planar portion 734 disposed upon, parallel with and unitarily formed with the medial planar portion 732.

Also disposed on the medial planar portion 732 and extending upward therefrom is a seating flange 736 unitarily formed with the arm 728 and located approximately the intersection of the first planar portion 730 and the medial planar portion 732. The seating flange 736 and the second planar portion 734 receive and support the lower leg member 710 of the roof rail portion 702 at assembly.

The means 706 for engaging the roof rail portion 702 and the side rail portion 704 includes a tang 738 unitarily formed with and extending upwardly from the upper leg member 720 of the side rail portion 704. The tang 738 and the upper leg member 720 cooperate to define an elongated first seat 740 for receiving and interdigitally engaging the roof rail portion 702.

The means 706 also includes a second tang 742 unitarily formed with the upper cross member 714 of the roof rail portion 702 and extending downward therefrom. The second tang 742 and the medial member 712 cooperate to define an elongated second seat 744 for receiving and interdigitally engaging the upper leg member 720 of the side rail portion. The side rail portion 702 also has a third seat 746 formed therein at the intersection of the medial member 710 and the lower leg member 716, as shown, for receiving and interdigitally engaging the tang 738 of the side rail portion 704.

Referring to FIG. 20, the lower leg member 716 of the roof rail portion and the upper leg member 720 and the arm 728 of the side rail portion 704 cooperate at assembly to define a clearance chamber 748 for receiving fasteners 750, such as screws or the like, used to mount marker lamps and other accessories (not shown) to the top rail 700. Also, when the roof rail portion 702 and the side rail portion 704 are fully engaged and interlocked, the medial member 712 of the roof rail portion 702 and the upper leg member 720 of the side rail portion 704 are counterposed to and urge against each other to reduce the stress at the joints defined by the seats 740,744 and the tangs 738, 742.

The top rail 700 may be weatherproofed by using elongated O-ring flexible seals similar to those shown in FIG. 8 and as previously described above for the first embodiment of the top rail 28, or by caulking.

It should be noted that in practicing the present invention, the two-piece rails are used for both the upper and bottom rails of the sides of the truck. In addition, a two-piece frontal bottom rail is also employed to provide a front wall module (not shown) having front wall supports or stiffeners (not shown) similar to the side wall supports 26 secured thereto. A two-piece upper or top front rail (not shown) is attached to the stiffeners and has the front of the roof secured thereto.

In assembling a cargo body utilizing the present invention, the side wall and front wall modules are secured to corner castings (not shown) by any suitable mode such as rivets or the like.

In FIG. 16, there is shown a typical wall fabrication. In accordance herewith, an interior skin or shell 520 is secured to the supports or stiffeners 26 on the cargo body interior side and an outer skin 36 is externally secured thereto. In installing the floor 42 or 524 and, in lieu of the channels heretofore defined, a Z-shaped ramp 522 may be deployed. The ramp 522 has a first leg 526, the edge of which abuts against the interior wall 520, while a second leg 528 downwardly depends therefrom. The second leg 528 has a height substantially equal to both the thickness of a floorboard 524 and the interiorly projecting portion of the bottom rail 502 to enable the enshrouding thereof. The ramp 522 includes a third leg 530 which defines a ledge for the sides of the lateral-most floorboards 524.

Also, by providing fastener holes (not shown) in the lower member 502 of the bottom rail 500 which mate with an associated sub-structure cross-member fastener receiving hole (not shown), the lower member 502 acts as a locator for the modular assembly since a leg or fixture is not needed to locate the cross-member to the bottom rail. Likewise, by virtue of the interdigitation between the members 502 and 504, the upper member 504 of the bottom rail 500 can be readily mounted to and properly located with respect to the floorboard(s) 524 and stiffener location.

The modular frame structure 10 hereof forms the basic frame for various types of truck cargo area bodies. Since it is the basic frame structure, it can be packaged at a manufacturing facility and shipped in a compact space to an assembly facility as a package or kit combining some unassembled pieces, such as the bottom rails 20, top rails 28, and pre-fabricated and pre-measured portions such as the roof structure 34, side wall supports 26 and sub-structure 16.

Also, the modular frame structure 10 hereof enables the assembly of portions thereof without using extensive fixturing, fasteners or welding while still obtaining interlocking joints which provide exact location as well as a strong connection. This is accomplished by the interdigitation of the bottom rail portions and the top rail portions which urge against and counterpose each other, thus relieving the stress on their respective seats. The interlocking joints of the first embodiment hereof also enables for a weather seal which is easily installed, long lasting and provides for a more effective seal than the normal caulking which has a tendency to become brittle and break down with age, thus requiring replacement.

In addition to the apparent mechanical advantages, the modular frame hereof substantially reduces the cost of material and assembly by eliminating parts, fixturing and a number of labor intensive assembly operations. The time to assemble the modular frame structure is also reduced.

Having thus described the present invention, what is claimed is:

1. A modular frame structure for a cargo area body of a truck comprising:

(a) first and second spaced apart substantially co-planar bottom rails, each bottom rail comprising:
   (1) a lower rail portion attachable to a truck sub-structure of a truck;
   (2) an upper rail portion which interlockingly engages the lower rail portion;
   (3) means for interlockingly engaging the lower rail portion and the upper rail portion;
   (4) means for sealing disposed proximate the means for interlockingly engaging, the means for sealing comprising at least an elongated O-ring seal;

(b) first and second spaced apart substantially co-planar top rails, each top rail being associated with a corresponding bottom rail, each top rail comprising:
   (1) a side rail portion;
   (2) a roof rail portion which interdigitately engages the side rail portion;
   (3) means for interlockingly engaging the side rail portion and the roof rail portion;
   (4) means for sealing disposed proximate the means for interlocking engaging, the means for sealing comprises at least an elongated an O-ring seal;

(c) at least one side wall support extending between each associated bottom rail and top rail and secured thereto; and (d) a roof structure extending between the top rails.

2. The modular frame structure of claim 1 wherein each lower rail portion comprises:

an elongated essentially L-shaped rail having a first leg member and an integral inwardly projecting second leg member.

3. The modular frame structure of claim 2 wherein each upper rail portion comprises:

an elongated essentially T-shaped rail having a cross-member and an integral inwardly directed arm member, the arm member intersecting with the cross-member.

4. The modular frame structure of claim 3 wherein the means for engaging the lower rail portion and the upper rail portion comprises:

(a) the second leg member of the lower rail portion having an elongated upwardly projecting indentation formed therein proximate the intersection of the first and second leg members; and (b) the cross-member of the upper rail portion having an elongated seat formed therein corresponding to the indentation of the lower rail portion, the seat receiving and interdigitally engaging with the second leg member of the lower rail portion seating in the indentation.

5. The modular frame structure of claim 1 wherein each side rail portion of each top rail comprises:

a first Z-shaped rail having a first lower leg member, a first medial member integral with the lower leg member and a first upper leg member, integral with the medial member.

6. The modular frame structure of claim 5 wherein each roof rail portion of each top rail comprises:

a Z-shaped rail having a second lower leg member, a second medial member, integral with the second lower leg member, the second medial member having a first wire wall extending essentially normal therefrom.

7. The modular frame structure of claim 6 wherein the means for engaging the side rail portion and the roof rail portion comprises:

(a) the side rail portion having a first elongated seat formed therein;

(b) the roof rail portion having a second elongated seat formed therein proximate the intersection of the second lower leg and the second medial member for receiving the first seat of the side rail portion;

(c) the roof rail portion having a third elongated seat formed therein proximate the intersection of the second medial member and the second upper leg member of the roof rail portion for receiving and interlockingly engaging the first upper leg member of the side rail portion; and wherein the first upper leg member of the side rail portion and the second medial member of the roof rail portion urge against and counterpose each other.

8. The modular frame structure of claim 6 further comprising:

a second wire wall integral with the second medial member and inwardly extending therefrom, the second wire wall cooperating with the first wire wall to form a channel therebetween for receiving electrical wiring.

9. The modular frame structure of claim 1 wherein the lower rail portion comprises:

(a) a first cross-member; and (b) a first leg member integral with the first cross-member and essentially normal thereto, the leg member intersecting the first cross-member at a first point such that a first portion of the first cross-member extends upwardly therefrom and a second portion longer than the first portion extends downwardly therefrom.

10. The modular frame structure of claim 9 wherein the upper rail portion comprises:

(a) a second cross-member;

(b) a second leg member integral with the second cross-member and essentially normal thereto, the second leg member intersecting the second cross-member at a second point such that a first portion of the second cross-member extends downwardly therefrom and a second portion longer than the first portion extends upwardly therefrom; and wherein the second cross-member and the second leg member of the upper rail portion and the first leg member of the lower rail portion cooperate to form an elongated seating channel for receiving a portion of a floor structure.

11. The modular frame structure of claim 10 wherein the means for engaging the lower rail portion and the upper rail portion comprises:

(a) the lower rail portion having a first seat formed therein proximately the first intersecting point;

(b) the cross-member of the upper rail portion having a second seat formed therein proximate the second intersecting point; and further wherein the first seat receives the first portion of the second cross-member and the second seat receives the first portion of the first cross-member, the first portion of the first cross-member and the first portion of the second cross-member urge against and counterpose each other.

12. The modular frame structure of claim 1 wherein each side rail portion of each top rail comprises:

a Z-shaped rail having a lower leg member, a medial member integral with the lower leg member, an upper leg member, integral with the medial member, an arm integral with and extending inward from the medial member, means for receiving and supporting wires extending inward from the medial member.

13. The modular frame structure of claim 12 wherein each roof rail portion of each top rail comprises:

a Z-shaped rail having a lower leg member, a medial member, integral with the lower leg member, an upper cross member integral with the medial member.

14. The modular frame structure of claim 12 wherein the means for receiving and supporting wires comprises:

an L-shaped rack integral with the medial member, the rack having a base portion aligned with the first leg member and a flange portion integral with the base member and extending essentially normally upward therefrom; and wherein the medial member, the base portion and the flange portion cooperate to define a channel for receiving and supporting wiring.

15. The modular frame structure of claim 13 wherein the means for engaging the side rail portion and the roof rail portion comprises:

(a) a side rail portion having a first tang integral with and extending from the upper leg member, the tang and the upper leg member defining a first elongated seat formed therein for receiving the median member of the roof rail portion;

(b) the roof rail portion having a second elongated seat formed therein proximate the intersection of the lower leg member and the medial member for receiving and interlockingly engaging the tang of the side rail portion;

(c) the roof rail portion having a second tang integral with the cross member of the roof rail portion and extending downward therefrom, the second tang and the medial member defining a third elongated seat therein for receiving and interlockingly engaging the upper leg member of the side rail portion; and wherein the upper leg member of the side rail portion and the medial member of the roof rail portion urge against and counterpose each other.

16. A modular frame structure for a cargo area body of a truck comprising:

(a) first and second spaced apart substantially co-planar bottom rails, each bottom rail comprising:

(1) a lower rail portion attachable to a truck substructure of a truck;

(2) an upper rail portion which interlockingly engages the lower rail portion;

(3) means for interlockingly engaging the lower rail portion and the upper rail portion;

(b) first and second spaced apart substantially co-planar top rails, each top rail being associated with a corresponding bottom rail, each top rail comprising:
  (1) a side rail portion comprising: a first Z-shaped rail having a first lower leg member, a first medial member integral with the lower leg member and a first upper leg member integral with the medial member;
  (2) a roof rail portion which interdigitally engages the side rail portion and comprising: a second Z-shaped member having a second lower leg member, a second medial member integral with the second lower leg member, the second medial member having a first wire wall extending substantially normal therefrom;
  (3) means for interlockingly engaging the side rail portion and the roof rail portion the means comprising:
  (c) the side rail portion having a first elongated seat formed therein;
  (d) the roof rail portion having a second elongated seat formed therein proximate a first intersection of the second lower leg and the second medial member for receiving the first seat of the side rail portion;
  (e) the roof rail portion having a third elongated seat formed therein proximate a second intersection of the second medial member and the second upper leg member of the roof rail portion for receiving and interlockingly engaging the first upper leg member of the side rail portion; and
  wherein the first upper leg member of the side rail portion and the second medial member of the roof rail portion urge against and counterpose each other.
  (f) at least one side wall support extending between each associated bottom rail and top rail and secured thereto; and
  (g) a roof structure extending between the upper rails.

17. The modular frame structure of claim 16 further comprising:
  a second wire wall integral with the second medial member and inwardly extending therefrom, the second wire wall cooperating with the first wire wall to form a channel therebetween for receiving electrical wiring.

18. A modular frame structure for a cargo area body of a truck comprising:
  (a) first and second spaced apart substantially co-planar bottom rails, each bottom rail comprising:
    (1) a lower rail portion attachable to a truck substructure of a truck the lower rail portion comprising:
      (a) a first cross-member and (b) a first leg member integral with the first cross-member and substantially normal thereto the leg member intersecting the first cross-member at a first point such that a first portion of the first cross-member extends upwardly therefrom and a second portion longer then the first portion extends downwardly therefrom.
    (2) an upper rail portion which interlockingly engages the lower rail portion, wherein the upper rail portion comprises:
    (a) a second cross-member;
    (b) a second leg member integral with the second cross-member and essentially normal thereto, the second leg member intersecting the second cross-member at a second point such that a first portion of the second cross-member extends downwardly therefrom and a second portion longer than the first portion extends upwardly therefrom; and
    wherein the second cross-member and the second leg member of the upper rail portion and the first leg member of the lower rail portion cooperate to form an elongated seating channel for receiving a portion of a floor structure;
    (3) means for interlockingly engaging the lower rail portion and the upper rail portion;
  (b) first and second spaced apart substantially co-planar top rails, each top rail being associated with a corresponding bottom rail, each top rail comprising:
    (1) a side rail portion;
    (2) a roof rail portion which interdigitally engages the side rail portion;
    (3) means for interlockingly engaging the side rail portion and the roof rail portion;
  (c) at least one side wall support extending between each associated bottom rail and top rail and secured thereto; and
  (d) a roof structure extending between the upper rails.

19. The modular frame structure of claim 18 wherein the means for engaging the lower rail portion and the upper rail portion comprises:
  (a) the lower rail portion having a first seat formed therein proximate the intersecting point;
  (b) the cross-member of the upper rail portion having a second seat formed therein proximate the intersecting point; and
  further wherein the first seat receives the first portion of the second cross-member and the second seat receives the first portion of the first cross-member, the first portion of the first cross-member and the first portion of the second cross-member urge against and counterpose each other.

* * * * *